(12) United States Patent
Takemoto et al.

(10) Patent No.: US 8,153,744 B2
(45) Date of Patent: Apr. 10, 2012

(54) HYPERBRANCHED POLYMER AND PROCESS FOR PRODUCTION THEREOF

(75) Inventors: Hiroki Takemoto, Kitakyushu (JP); Masaaki Ozawa, Funabashi (JP); Koji Ishizu, Tokyo (JP)

(73) Assignees: Nissan Chemical Industries, Ltd., Tokyo (JP); Tokyo Institute of Technology, Tokyo (JP)

( * ) Notice: Subject to any disclaimer, the term of this patent is extended or adjusted under 35 U.S.C. 154(b) by 234 days.

(21) Appl. No.: 12/310,804

(22) PCT Filed: Sep. 4, 2007

(86) PCT No.: PCT/JP2007/067226
§ 371 (c)(1), (2), (4) Date: Apr. 1, 2009

(87) PCT Pub. No.: WO2008/029806
PCT Pub. Date: Mar. 13, 2008

(65) Prior Publication Data
US 2010/0010183 A1 Jan. 14, 2010

(30) Foreign Application Priority Data
Sep. 7, 2006 (JP) .................................. 2006-242797

(51) Int. Cl.
*C08F 212/08* (2006.01)
*C08F 28/02* (2006.01)
*C08F 2/46* (2006.01)
*C08F 212/06* (2006.01)
*C08F 28/00* (2006.01)

(52) U.S. Cl. .......... 526/347; 526/72; 526/286; 526/288; 526/346; 525/326.2; 525/328.4; 525/55; 522/151; 522/150; 522/173; 522/178; 522/180; 522/184; 522/182; 522/188

(58) Field of Classification Search ............... 525/328.2, 525/328.4, 55; 526/72, 286, 288, 346, 347; 522/150, 151, 173, 178, 180, 182, 184, 188
See application file for complete search history.

(56) References Cited

U.S. PATENT DOCUMENTS

| 6,414,101 B1 | 7/2002 | Watanabe et al. | |
| 2008/0139692 A1* | 6/2008 | Ishizu et al. | 522/173 |
| 2010/0144957 A1* | 6/2010 | Yasui | 524/547 |

FOREIGN PATENT DOCUMENTS

| JP | A-2000-344836 | 12/2000 |
| JP | 2004256563 A * | 9/2004 |
| WO | WO 2005/052009 A1 | 6/2005 |
| WO | WO 2005/061566 A1 | 7/2005 |
| WO | WO 2006/093050 A1 | 9/2006 |
| WO | WO 2006/101003 A1 | 9/2006 |
| WO | WO 2007/049608 A1 | 5/2007 |
| WO | WO 2008117772 A1 * | 10/2008 |

OTHER PUBLICATIONS

Tomita et al. Organic nanoparticles (hyperbranched polymer) dispersed photopolymers for volume holographic stroage. Applied Physics Letters, 88, 071103 (2006).*
Ishizu et al., "Synthesis of hyperbranched polymers by self-addition free radical vinyl polymerization of photo functional styrene," *Macromol. Rapid Commun.*, vol. 21, No. 10, pp. 665-668, 2000.
Ishizu et al., "Novel synthesis of branched polystyrenes by quasi-living radical copolymerization using photofunctional inimer," *Polymer International*, vol. 50, pp. 906-910, 2001.
Ishizu et al., "Kinetics of Hyperbranched Polystyrenes by Free Radical Polymerization of Photofunctional Inimer," *Macromolecules*, vol. 35, No. 9, pp. 3781-3784, 2002.
Ishizu et al., "Synthesis and characterization of hyperbranced poly(ethyl methacrylate) by quasi-living radical polymerization of photofunctional inimer," *Polymer International*, vol. 51, pp. 424-428, 2002.
Ishizu et al., "Kinetics on Formation of Hyperbranched Poly(ethyl methacrylate) via a Controlled Radical Mechanism of Photofunctional Inimer," *Macromolecules*, vol. 36, No. 10, pp. 3505-3510, 2003.
Ishizu et al., "Novel synthesis and solution properties of hyperbranched poly(ethyl methacrylate)s by quasi-living radical Copolymerization using photofunctional inimer," *Polymer International*, vol. 53, pp. 259-265, 2004.

* cited by examiner

*Primary Examiner* — Sanza McClendon
(74) *Attorney, Agent, or Firm* — Oliff & Berridge, PLC

(57) ABSTRACT

There is provided a novel hyperbranched polymer in which the refractive index is precisely controlled while retaining its hyperbranched structure, and a method for producing the hyperbranched polymer. Further, there is also provided an optically and thermally stable novel hyperbranched polymer in which the desired refractive index is precisely controlled, and a method for producing the hyperbranched polymer. The hyperbranched polymer has, as a branched structure, a repeating unit structure produced from two dithiocarbamate compounds each having a vinyl structure, at the polymerization initiation site having a vinyl structure. A specific example of the hyperbranched polymer can be produced by subjecting to a living radical polymerization N,N-diethyldithiocarbamyl-methylstyrene in the presence of N,N-diethyldithiocarbamylethyl methacrylate.

13 Claims, 4 Drawing Sheets

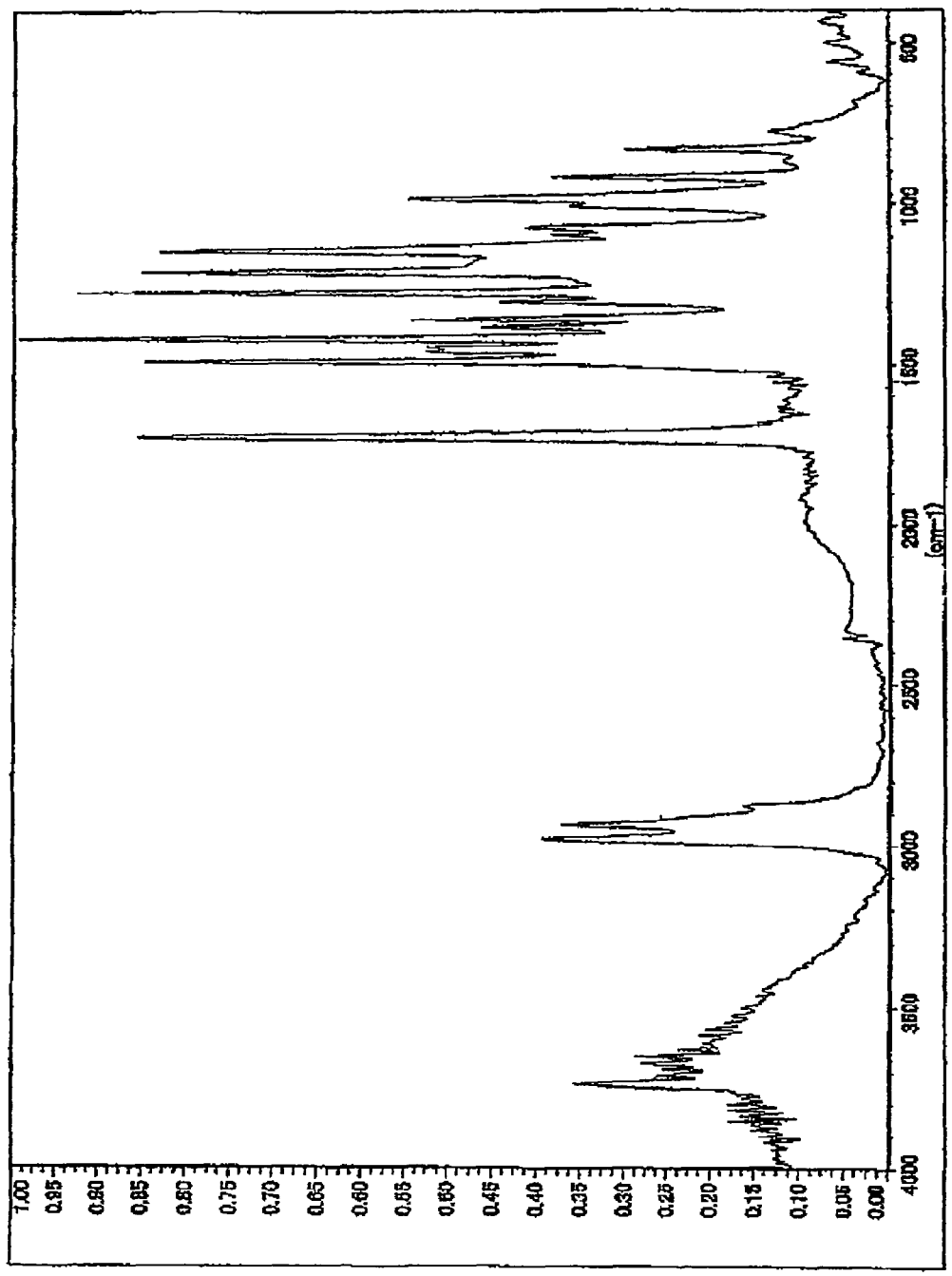
[FIG. 1]

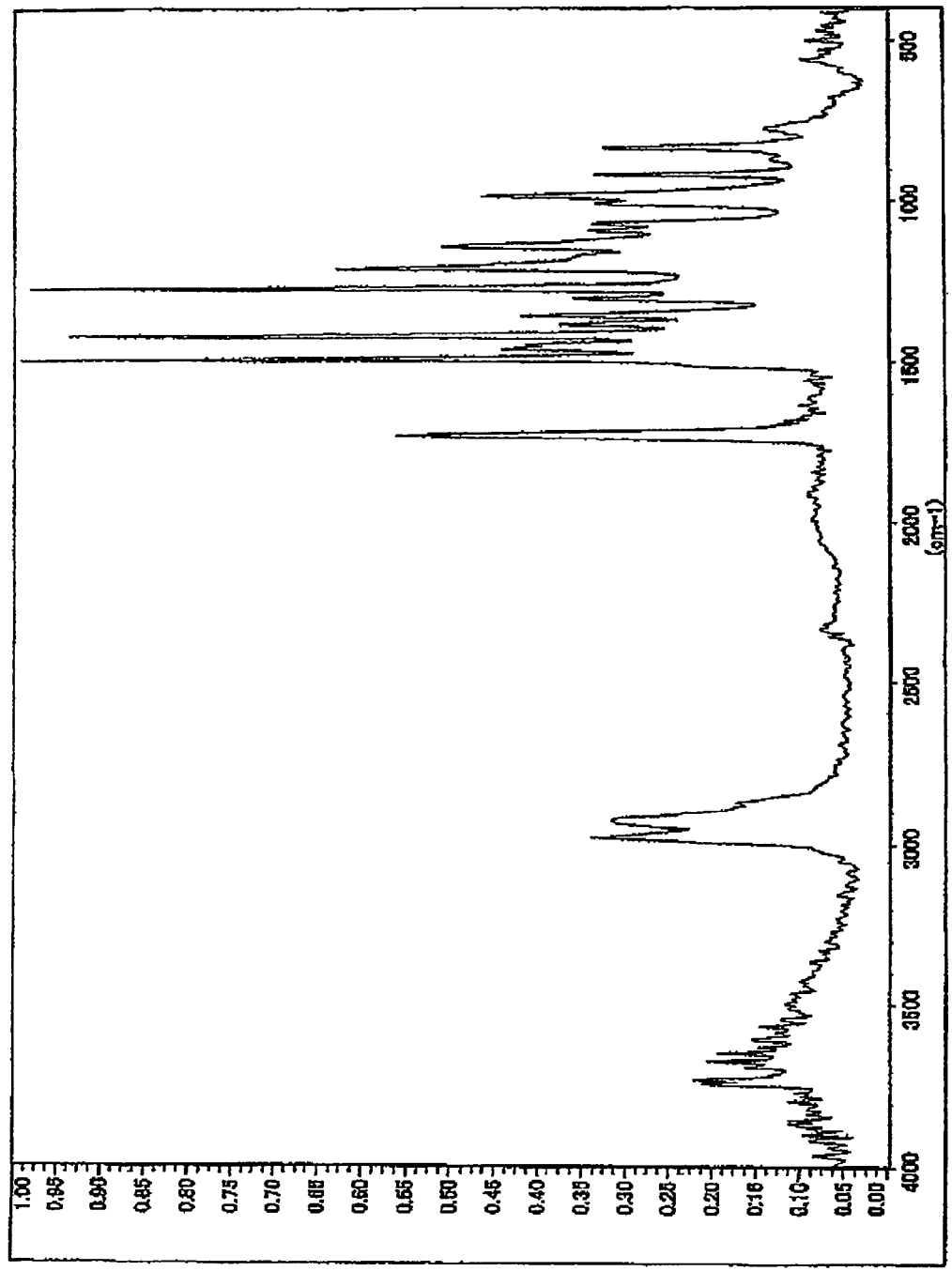
[FIG. 2]

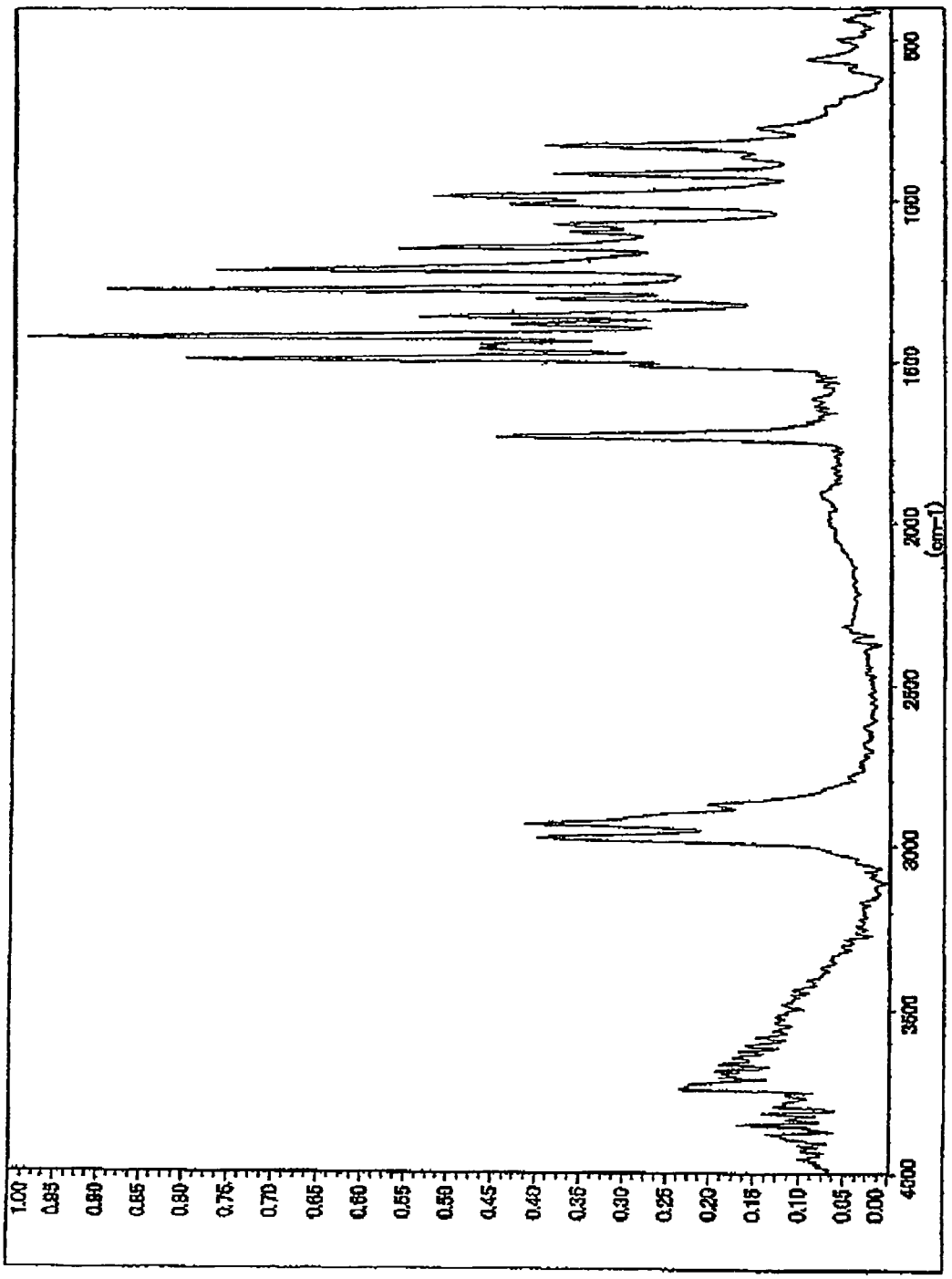
[FIG. 3]

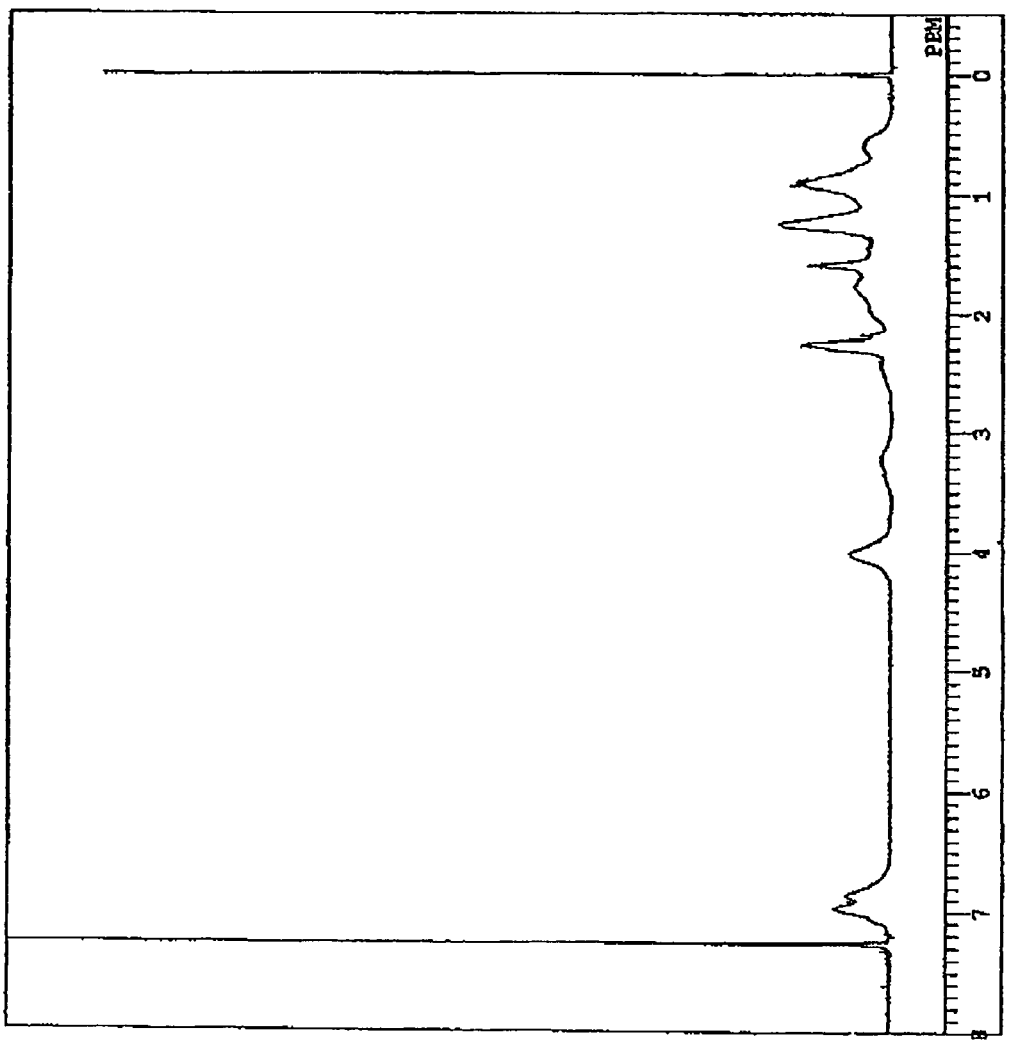
[FIG. 4]

HYPERBRANCHED POLYMER AND PROCESS FOR PRODUCTION THEREOF

TECHNICAL FIELD

The present invention relates to a novel hyperbranched polymer and a method for producing the same. The hyperbranched polymer of the present invention is particularly excellent in the controllability of the refractive index, also has such characteristics as being optically and thermally stable, and is preferably utilized as optical materials, paints, inks, adhesives, resin fillers, various molding materials, nanometer pore forming agents, chemical and mechanical abrasives, supporting materials for functional substances, nanocapsules, photonic crystals, resist materials, electronic materials, information recording materials, printing materials, battery materials, medical materials, magnetic materials, and the like.

BACKGROUND ART

Hyperbranched polymers are classified as dendritic polymers together with dendrimers. While related-art polymers generally have a string form, these dendritic polymers have these own specific structures in a respect of introducing a branched structure positively. Accordingly, these dendritic polymers have various characteristics such as having a nanometer size, having surfaces capable of retaining many functional groups, being capable of having a lower viscosity than linear polymers, exhibiting a behavior like fine particles with little entanglement between molecules, and being amorphous to be able to control their solubility in a solvent, so that expectations lie in applications utilizing these characteristics.

Particularly, the most remarkable characteristic of dendritic polymers is a large number of terminal groups. The more the molecular weight is, the more the number of branched chains increases, therefore, the absolute number of terminal groups becomes larger as the molecular weight of dendritic polymers increases. In such a dendritic polymer having a large number of terminal groups, intermolecular interactions depend largely on the types of the terminal groups, resulting in large variations in the glass transition temperature, the solubility, the thin film forming property, or the like. Accordingly, such a dendritic polymer has characteristics that no general linear polymer has. Further, when reactive functional groups are added to such a dendritic polymer as terminal groups, the dendritic polymer have the functional groups with an extremely high density, therefore its applications as, for example, a high sensitive scavenger for functional substances, a high sensitive multifunctional crosslinking agent, a dispersant for metals or metal oxides, or a coating agent, are expected.

An advantage of the hyperbranched polymer over the dendrimer is in its simplicity for synthesis, which is advantageous particularly in an industrial production. Generally, while the dendrimer is synthesized by repeating protection and deprotection, the hyperbranched polymer is synthesized by a one-step polymerization of a so-called $AB_x$ type monomer having in one molecule, a total of three or more substituents of two types.

As a synthesis method of a hyperbranched polymer, a method for synthesizing the hyperbranched polymer by a living radical polymerization of a compound having a vinyl group while having a photo polymerization initiating ability, is known. For example, a synthesis method of a hyperbranched polymer by a photo polymerization of a styrene compound having a dithiocarbamate group (see Non-Patent Documents 1, 2 and 3), and a synthesis method of a hyperbranched polymer having a dithiocarbamate group by a photo polymerization of an acrylic compound having a dithiocarbamate group (see Non-Patent Documents 4, 5 and 6), are known. However, when these hyperbranched polymers are applied in optical fields, since a technology for precisely controlling the refractive index of the hyperbranched polymer becomes necessary, a hyperbranched polymer in which the refractive index is precisely controlled while retaining its hyperbranched structure, has been desired. In addition, since these hyperbranched polymers have in the molecule thereof, a dithiocarbamate group having a photo polymerization initiating ability, they remain in a living state relative to light and do not have high thermal stability. Thus, an optically and thermally stable hyperbranched polymer having no dithiocarbamate group has been desired.

[Non-Patent Document 1]
Koji Ishizu, Akihide Mori, Macromol. Rapid Commun. 21, 665-668 (2000)
[Non-Patent Document 2]
Koji Ishizu, Akihide Mori, Polymer International 50, 906-910 (2001)
[Non-Patent Document 3]
Koji Ishizu, Yoshihiro Ohta, Susumu Kawauchi, Macromolecules Vol. 35, No. 9, 3781-3784 (2002)
[Non-Patent Document 4]
Koji Ishizu, Takeshi Shibuya, Akihide Mori, Polymer International 51, 424-428 (2002)
[Non-Patent Document 5]
Koji Ishizu, Takeshi Shibuya, Susumu Kawauchi, Macromolecules Vol. 36, No. 10, 3505-3510 (2002)
[Non-Patent Document 6]
Koji Ishizu, Takeshi Shibuya, Jaebum Park, Satoshi Uchida, Polymer International 53, 259-265 (2004)

DISCLOSURE OF THE INVENTION

Problems to be Solved by the Invention

It is an object of the present invention to provide a novel hyperbranched polymer in which the refractive index is precisely controlled while retaining its hyperbranched structure, and to provide a method for producing the hyperbranched polymer. Further, it is another object of the present invention to provide an optically and thermally stable novel hyperbranched polymer in which the refractive index is precisely controlled, and to provide a method for producing the hyperbranched polymer.

Means for Solving the Problems

The present invention relates to, according to a first aspect, a hyperbranched polymer represented by Formula (5):

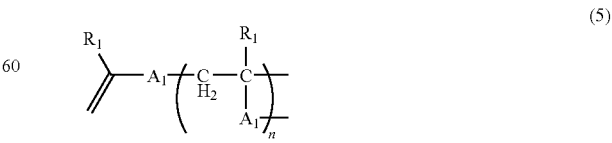

(where $R_1$ and $A_1$ represent the same as defined in Formula (1), and n is the number of branched repeating unit structures which represents an integer of 2 to 100,000), in which to a polymerization initiation site represented by Formula (1):

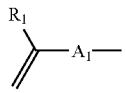
(1)

(where $R_1$ represents a hydrogen atom or a methyl group; and $A_1$ represents Formula (2) or Formula (3):

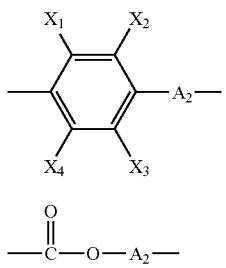
(2)

(3)

(where $A_2$ represents a linear, branched or cyclic alkylene group having 1 to 30 carbon atoms, which may contain an ether bond or an ester bond; each of $X_1$, $X_2$, $X_3$ and $X_4$ represents a hydrogen atom, an alkyl group having 1 to 20 carbon atoms, an alkoxy group having 1 to 20 carbon atoms, a halogen atom, a nitro group, a hydroxy group, an amino group, a carboxyl group or a cyano group)), a branched repeating unit represented by Formula (4):

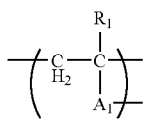
(4)

(where $R_1$ and $A_1$ represent the same as defined in Formula (1)), is coupled, and in which a branched repeating unit structure in Formula (5) has a structure in which a branched repeating unit represented by Formula (4) in which $A_1$ represents Formula (2) and a branched repeating unit represented by Formula (4) in which $A_1$ represents Formula (3) are coupled to each other (with the proviso that $R_1$ in Formula (4) in which $A_1$ represents Formula (2) and $R_1$ in Formula (4) in which $A_1$ represents Formula (3) may be the same as or different from each other).

According to a second aspect, in the hyperbranched polymer according to the first aspect, in the polymerization initiation site represented by Formula (1), $A_1$ represents Formula (6) or Formula (7):

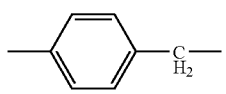
(6)

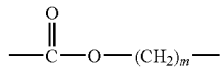
(7)

(where m represents an integer of 2 to 10), and a branched repeating unit structure in Formula (5) has a structure in which a branched repeating unit represented by Formula (4) in which $A_1$ represents Formula (6) and a branched repeating unit represented by Formula (4) in which $A_1$ represents Formula (7) are coupled to each other.

According to a third aspect, in the hyperbranched polymer according to the first aspect, among the total amount of the branched repeating unit represented by Formula (4) contained in the hyperbranched polymer represented by Formula (5), the total amount of the branched repeating unit represented by Formula (4) in which $A_1$ represents Formula (2) is 1 to 99 mol % and the total amount of the branched repeating unit represented by Formula (4) in which $A_1$ represents Formula (3) is 99 to 1 mol %.

According to a fourth aspect, in the hyperbranched polymer according to the first aspect, the polymerization initiation site represented by Formula (1) is represented by Formula (8) or Formula (9):

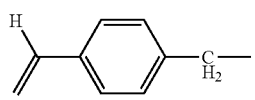
(8)

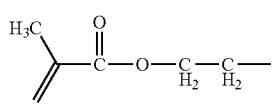
(9)

and the branched repeating unit represented by Formula (4) is represented by Formula (10) or Formula (11):

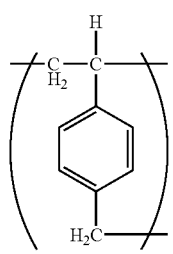
(10)

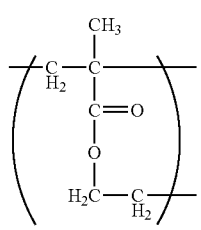
(11)

and the branched repeating unit structure in Formula (5) has a structure in which a branched repeating unit represented by Formula (10) and a branched repeating unit represented by Formula (11) are coupled to each other.

According to a fifth aspect, in the hyperbranched polymer according to any one of the first aspect to the fourth aspect, a molecule terminal thereof is a dithiocarbamate group or a hydrogen atom.

According to a sixth aspect, in the hyperbranched polymer according to any one of the first aspect to the fifth aspect, the weight average molecular weight is 500 to 5,000,000, as measured by a gel permeation chromatography in a converted molecular weight as polystyrene.

According to a seventh aspect, a production method of the hyperbranched polymer according to the first aspect includes: living-radical polymerizing a dithiocarbamate compound represented by Formula (12):

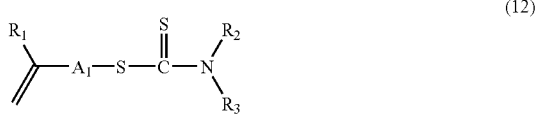

(12)

(where $R_1$ and $A_1$ represent the same as defined in Formula (1); and each of $R_2$ and $R_3$ represents an alkyl group having 1 to 5 carbon atoms, a hydroxyalkyl group having 1 to 5 carbon atoms or an arylalkyl group having 7 to 12 carbon atoms, or $R_2$ and $R_3$ may be bonded to each other to form a ring together with a nitrogen atom bonded to $R_2$ and $R_3$),
in the co-presence of a dithiocarbamate compound represented by Formula (12) in which $A_1$ represents Formula (2) and a dithiocarbamate compound represented by Formula (12) in which $A_1$ represents Formula (3).

According to an eighth aspect, a production method of the hyperbranched polymer according to the first aspect having a dithiocarbamate group at a molecule terminal thereof which is obtained by living-radical polymerizing the dithiocarbamate compound represented by Formula (12) in which $A_1$ represents Formula (2) as described in the seventh aspect and the dithiocarbamate compound represented by Formula (12) in which $A_1$ represents Formula (3) as described in the seventh aspect which are in the co-presence.

According to a ninth aspect, in the production method of the hyperbranched polymer according to the seventh aspect or the eighth aspect, the dithiocarbamate compound represented by Formula (12) in which $A_1$ represents Formula (2) is N,N-diethyldithiocarbamylmethylstyrene and the dithiocarbamate compound represented by Formula (12) in which $A_1$ represents Formula (3) is N,N-diethyldithiocarbamylethyl methacrylate.

According to a tenth aspect, in the production method of the hyperbranched polymer according to any one of the seventh aspect to the ninth aspect, the living radical polymerization is performed in an organic solvent solution containing the dithiocarbamate compound represented by Formula (12) by irradiating light.

According to an eleventh aspect, a production method of the hyperbranched polymer according to the first aspect having a hydrogen atom at a molecule terminal thereof includes: living-radical polymerizing the dithiocarbamate compound represented by Formula (12) in which $A_1$ represents Formula (2) as described in the seventh aspect and the dithiocarbamate compound represented by Formula (12) in which $A_1$ represents Formula (3) as described in the seventh aspect which are in the co-presence; and reducing a dithiocarbamate group at a molecule terminal of the hyperbranched polymer obtained by the polymerization.

According to a twelfth aspect, in the production method of the hyperbranched polymer according to the eleventh aspect, the dithiocarbamate compound represented by Formula (12) in which $A_1$ represents Formula (2) is N,N-diethyldithiocarbamylmethylstyrene and the dithiocarbamate compound represented by Formula (12) in which $A_1$ represents Formula (3) is N,N-diethyldithiocarbamylethyl methacrylate.

According to a thirteenth aspect, in the production method of the hyperbranched polymer according to the eleventh aspect or the twelfth aspect, the reduction is performed by irradiating light in the presence of hydrogenated tributyltin.

According to a fourteenth aspect, in the production method of the hyperbranched polymer according to the eleventh aspect or the twelfth aspect, the reduction is performed by irradiating light in an organic solvent solution containing a hyperbranched polymer having a dithiocarbamate group at a molecule terminal thereof in the presence of hydrogenated tributyltin.

Effects of the Invention

Although the hyperbranched polymer of the present invention contains different monomer types, the refractive index of the hyperbranched polymer is precisely controlled corresponding to the ratio of monomer types while retaining the hyperbranched structure. Further, an optically and thermally stable hyperbranched polymer in which the refractive index is precisely controlled can be obtained. In addition, according to the production method of the present invention, a hyperbranched polymer having these characteristics can be simply and efficiently obtained.

BEST MODES FOR CARRYING OUT THE INVENTION

The hyperbranched polymer of the present invention is a hyperbranched polymer having a structure represented by Formula (5) in which a branched repeating unit represented by Formula (4) is coupled to a polymerization initiation site represented by Formula (1) and having a branched repeating unit structure in Formula (5) in which a branched repeating unit represented by Formula (4) in which $A_1$ represents Formula (2) and a branched repeating unit represented by Formula (4) in which $A_1$ represents Formula (3) are coupled to each other. $R_1$ in Formulae (1), (4) and (5) represents a hydrogen atom or a methyl group. However, $R_1$ in Formula (4) in which $A_1$ represents Formula (2) and $R_1$ in Formula (4) in which $A_1$ represents Formula (3) may be the same as or different from each other.

In addition, n in Formula (5) is the number of branched repeating unit structures and represents an integer of 2 to 100,000.

Further, the present invention also includes a hyperbranched polymer having a dithiocarbamate group or a hydrogen atom at a molecule terminal thereof.

In Formulae (2) and (3), $A_1$ represents a linear, branched or cyclic alkylene group having 1 to 30 carbon atoms which may contain an ether bond or an ester bond; each of $X_1$, $X_2$, $X_3$ and $X_4$ represents a hydrogen atom, an alkyl group having 1 to 20 carbon atoms, an alkoxy group having 1 to 20 carbon atoms, a halogen atom, a nitro group, a hydroxy group, an amino group, a carboxyl group or a cyano group.

Specific examples of the alkylene group include a linear alkylene group, such as a methylene group, an ethylene group, an n-propylene group, an n-butylene group and an n-hexylene group; and a branched alkylene group, such as an isopropylene group, an isobutylene group and a 2-methylpropylene group. In addition, examples of the cyclic alkylene group include an alicyclic aliphatic group having a monocyclic, polycyclic and crosslinked cyclic structure having 3 to 30 carbon atoms. Specific examples thereof can include groups having a monocyclo, bicyclo, tricyclo, tetracyclo or pentacyclo structure having 4 or more carbon atoms. For example, structural examples (a) to (s) of the alicyclic part in the alicyclic aliphatic group are shown as follows:

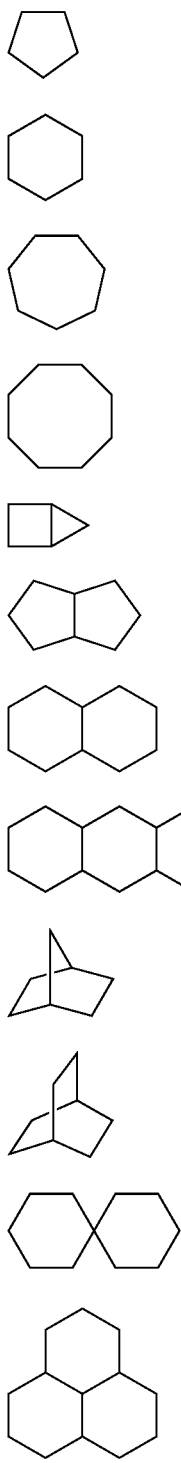
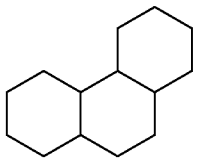
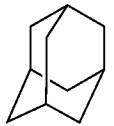
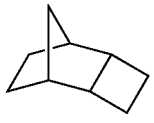
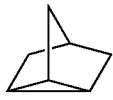
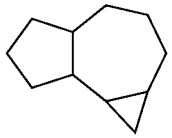

Examples of the alkyl group having 1 to 20 carbon atoms of $X_1$, $X_2$, $X_3$ and $X_4$ include a methyl group, an ethyl group, an isopropyl group, a cyclohexyl group and an n-pentyl group. Examples of the alkoxy group having 1 to 20 carbon atoms include a methoxy group, an ethoxy group, an isopropoxy group, a cyclohexyloxy group and an n-pentyloxy group. In addition, examples of the halogen atom include a fluorine atom, a chlorine atom, a bromine atom and an iodine atom. Among them, preferred examples of $X_1$, $X_2$, $X_3$ and $X_4$ include a hydrogen atom or an alkyl group having 1 to 20 carbon atoms.

In addition, $A_1$ in Formula (1) preferably represents a structure represented by Formula (6) or Formula (7).

In Formula (7), m represents an integer of 2 to 10 and is preferably 2 or 3, and the branched repeating unit structure in Formula (5) has preferably a structure in which a branched repeating unit represented by Formula (4) in which $A_1$ represents Formula (6) and a branched repeating unit represented by Formula (4) in which $A_1$ represents Formula (7) are randomly coupled to each other.

Next, the structure of the hyperbranched polymer of the present invention is described.

The hyperbranched polymer of the present invention having a branched repeating unit structure represented by Formula (5) takes a structure in which a branched repeating unit represented by Formula (4) is coupled to a polymerization initiation site having a vinyl group and represented by Formula (1).

In an example of the hyperbranched polymer having a dithiocarbamate group at a molecule terminal thereof, when n representing the number of branched repeating unit structures is 2, as the structure, Formulae (13) and (14):

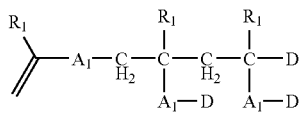
(13)

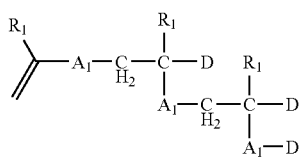
(14)

(where $R_1$ and $A_1$ represent the same as defined in Formula (1); and D represents a dithiocarbamate group), can be expected.

Then, in the branched repeating unit structure, at least one of $A_1$s has a structure of Formula (2) or a structure of Formula (3), and all of the structures do not necessarily have a structure of Formula (2) or a structure of Formula (3). Accordingly, when the structures represented by Formulae (2) and (3) are abbreviated to respectively X and Z, specifically, the following structural formulae can be expected.

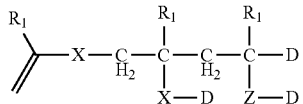
(13-1)

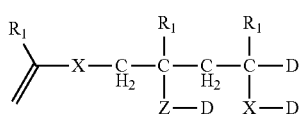
(13-2)

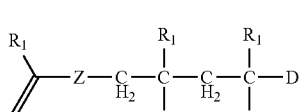
(13-3)

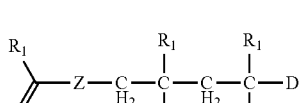
(13-4)

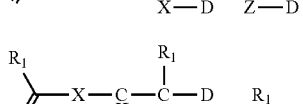
(14-1)

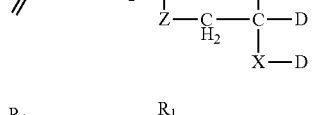
(14-2)

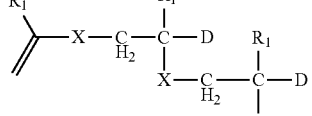

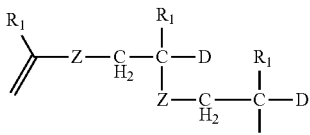
(14-3)

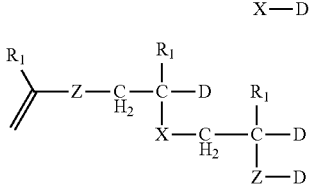
(14-4)

When n representing the number of branched repeating unit structures is 3, one of dithiocarbamate groups at the terminals of Formulae (13) and (14) becomes Formula (4) and as the structure thereof, Formulae (15) to (19) can be expected.

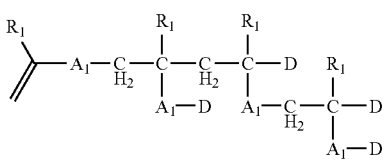
(15)

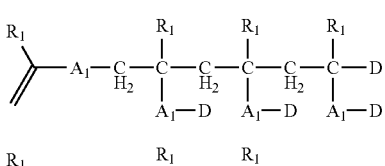
(16)

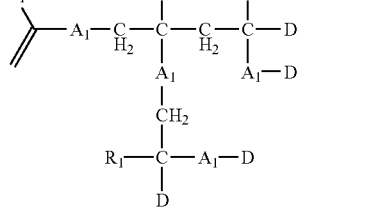
(17)

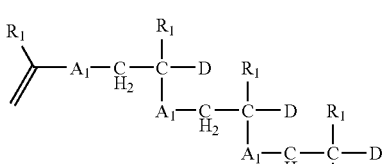
(18)

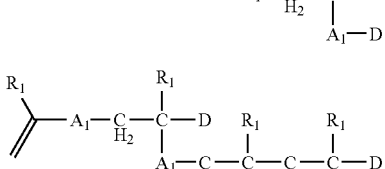
(19)

(where $R_1$ and $A_1$ represent the same as defined in Formula (1); and D represents a dithiocarbamate group.)

Then, when the structures represented by Formulae (2) and (3) are abbreviated to respectively X and Z, similar to the above-shown structural formulae in which n is 2, a large number of structural formulae corresponding to Formulae (15) to (19) can be expected. For example, as bonding modes of the sequence of Formula (15), specifically, the following structural formulae can be expected.

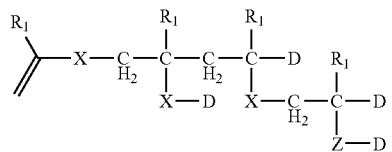
(15-1)

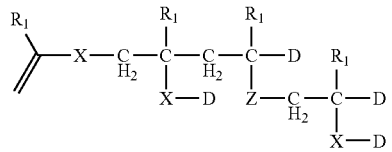
(15-2)

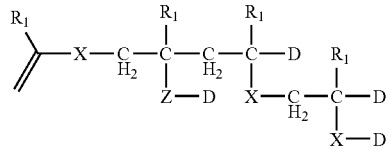
(15-3)

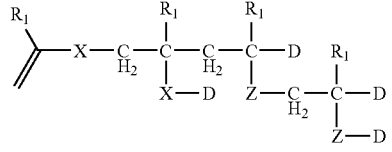
(15-4)

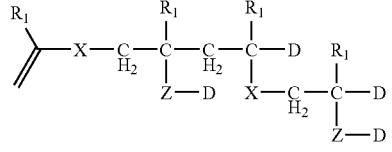
(15-5)

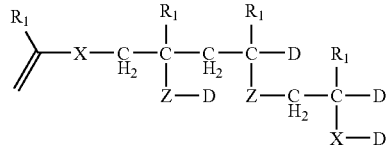
(15-6)

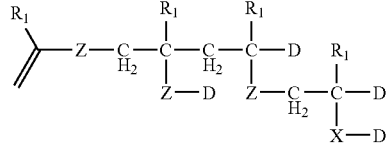
(15-7)

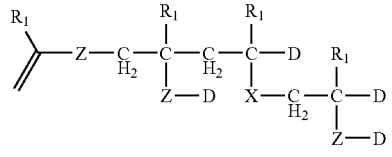
(15-8)

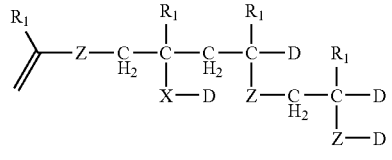
(15-9)

-continued

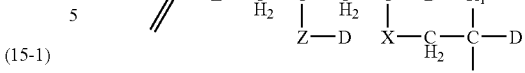
(15-10)

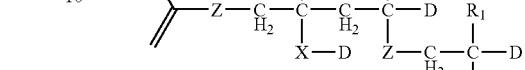
(15-11)

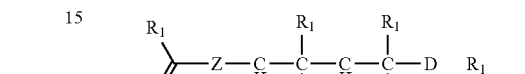
(15-12)

Similar to the above-shown structural formulae, also in bonding types of the sequence of Formulae (16) to (19), various structural formulae can be expected.

When n representing the number of branched repeating unit structures is 4 or more, many more structures can be expected.

The branched repeating unit structure of a hyperbranched polymer represented by Formula (5) has a structure in which a branched repeating unit represented by Formula (4) in which $A_1$ represents Formula (2) and a branched repeating unit structure represented by Formula (4) in which $A_1$ represents Formula (3) are in the co-presence.

Then, the hyperbranched polymer represented by Formula (5) includes any of hyperbranched polymers in which each of branched repeating unit structures is regularly bonded at three points to form a branched structure, and hyperbranched polymers in which each of branched repeating unit structures is bonded at two points to form a linear structure without being branched.

In the hyperbranched polymer of the present invention, among the total amount of a branched repeating unit represented by Formula (4) contained in the hyperbranched polymer represented by Formula (5), the total amount of the branched repeating unit represented by Formula (4) in which $A_1$ represents Formula (2) is 1 to 99 mol % and the total amount of the branched repeating unit represented by Formula (4) in which $A_1$ represents Formula (3) is 99 to 1 mol %. Preferably, the total amount of the branched repeating unit represented by Formula (4) in which $A_1$ represents Formula (2) is 5 to 95 mol % and the total amount of the branched repeating unit represented by Formula (4) in which $A_1$ represents Formula (3) is 95 to 5 mol %. More preferably, the total amount of the branched repeating unit represented by Formula (4) in which $A_1$ represents Formula (2) is 10 to 90 mol % and the total amount of the branched repeating unit represented by Formula (4) in which $A_1$ represents Formula (3) is 90 to 10 mol %.

Then, the sequence type of the copolymer of the branched repeating unit represented by Formula (4) in which $A_1$ represents Formula (2) and the branched repeating unit represented by Formula (4) in which $A_1$ represents Formula (3) may be any of random copolymer, alternating copolymer and block copolymer.

The hyperbranched polymer of the present invention has a weight average molecular weight Mw, measured by a gel permeation chromatography in a converted molecular weight as polystyrene, of 500 to 5,000,000, preferably 1,000 to 1,000,000, more preferably 2,000 to 500,000, most preferably 3,000 to 100,000. In addition, the degree of distribution of the hyperbranched polymer of the present invention, which is Mw (weight average molecular weight)/Mn (number average molecular weight), is 1.0 to 10.0, preferably 1.1 to 9.0, more preferably 1.2 to 8.0.

Next, the production method of the hyperbranched polymer of the present invention having a branched repeating unit structure represented by Formula (5) is described.

The hyperbranched polymer of the present invention having a structure represented by Formula (5) can be produced by a method including: living-radical polymerizing a dithiocarbamate compound represented by Formula (12) in the co-presence of a dithiocarbamate compound represented by Formula (12) in which $A_1$ represents Formula (2) and a dithiocarbamate compound represented by Formula (12) in which $A_1$ represents Formula (3).

In addition, by the production method, a hyperbranched polymer having a dithiocarbamate group at a molecule terminal thereof can also be produced. Further, by reducing the dithiocarbamate group at a molecule terminal of the hyperbranched polymer obtained by the above method, a hyperbranched polymer having a hydrogen atom at a molecule terminal thereof can also be produced.

In Formula (12), $R_1$ and $A_1$ represent the same as defined in Formula (1). Each of $R_2$ and $R_3$ represents an alkyl group having 1 to 5 carbon atoms, a hydroxyalkyl group having 1 to 5 carbon atoms or an arylalkyl group having 7 to 12 carbon atoms. In addition $R_2$ and $R_3$ may be bonded to each other to form a ring together with a nitrogen atom bonded to $R_2$ and $R_3$.

Examples of the alkyl group having 1 to 5 carbon atoms include a methyl group, an ethyl group, an isopropyl group, a t-butyl group, a cyclopentyl group and an n-pentyl group. Examples of the hydroxyalkyl group having 1 to 5 carbon atoms include a hydroxymethyl group, a hydroxyethyl group and a hydroxypropyl group. Examples of the arylalkyl group having 7 to 12 carbon atoms include a benzyl group and a phenethyl group.

Examples of the ring formed with $R_2$ and $R_3$ which are bonded to each other together with a nitrogen atom bonded to $R_2$ and $R_3$ include a 4- to 8-membered ring; a ring containing 4 to 6 methylene groups in the ring; and a ring containing an oxygen atom or a sulfur atom and 4 to 6 methylene groups. Specific examples of the ring formed with $R_2$ and $R_3$ which are bonded to each other together with a nitrogen atom bonded to $R_2$ and $R_3$ include a piperazine ring, a pyrrolidine ring, a morpholine ring, a thiomorpholine ring and a homopiperazine ring.

The dithiocarbamate compound represented by Formula (12) can be easily obtained according to a nucleophilic substitution reaction between a compound represented by Formula (20) and a compound represented by Formula (21):

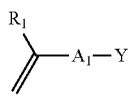
(20)

-continued

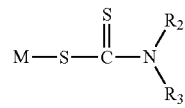
(21)

In Formula (20), Y represents a leaving group. Examples of the leaving group include a fluorine atom, a chlorine atom, a bromine atom, an iodine atom, a mesyl group and a tosyl group. In Formula (21), M represents lithium, sodium or potassium.

It is preferred that the nucleophilic substitution reaction is usually effected in an organic solvent capable of dissolving both the above two types of compounds. After the completion of the reaction, by a liquid separation treatment using water/nonaqueous organic solvent and a recrystallization treatment, the dithiocarbamate compound represented by Formula (12) can be obtained in a high purity. In addition, the dithiocarbamate compound represented by Formula (12) can also be produced referring to the method described in Macromol. Rapid Commun. 21, 665-668 (2000) or Polymer International 51, 424-428 (2002).

Specific examples of the dithiocarbamate compound represented by Formula (12) include as a dithiocarbamate compound in which $A_1$ represents Formula (2), N,N-diethyldithiocarbamylmethylstyrene and as a dithiocarbamate compound in which $A_1$ represents Formula (3), N,N-diethyldithiocarbamylethyl methacrylate.

Then, by a method including: living-radical polymerizing the dithiocarbamate compound represented by Formula (12) in the co-presence of the dithiocarbamate compound in which $A_1$ represents Formula (2) and the dithiocarbamate compound in which $A_1$ represents Formula (3), the hyperbranched polymer having a branched repeating unit structure represented by Formula (5) can be obtained. In addition, by the polymerization method, a hyperbranched polymer having a dithiocarbamate group at a molecule terminal thereof can be obtained. Although the living radical polymerization can be performed by a heretofore known polymerization method, such as a bulk polymerization, a solution polymerization, a suspension polymerization and an emulsion polymerization, a solution polymerization in an organic solvent solution is preferred.

In the case of the solution polymerization, the polymerization is performed by effecting the polymerization reaction with using a dithiocarbamate compound in which $A_1$ represents Formula (2) and a dithiocarbamate compound in which $A_1$ represents Formula (3), as the dithiocarbamate compound represented by Formula (12), in any concentration thereof in an organic solvent solution capable of dissolving these compounds. For example, the ratio of the dithiocarbamate compound in which $A_1$ represents Formula (3) relative to the dithiocarbamate compound in which $A_1$ represents Formula (2) is 0.01 to 99 molar equivalent, preferably 0.05 to 19 molar equivalent, more preferably 0.1 to 9 molar equivalent.

In addition, in the case of the solution polymerization, the total amount of the dithiocarbamate compound in which $A_1$ represents Formula (2) and the dithiocarbamate compound in which $A_1$ represents Formula (3) which are used as the dithiocarbamate compound represented by Formula (12) in the solution is 1 to 80% by mass, preferably 2 to 70% by mass, more preferably 5 to 60% by mass, based on the total mass (the total mass of the dithiocarbamate compound in which $A_1$ represents Formula (2), the dithiocarbamate compound in which $A_1$ represents Formula (3) and the organic solvent).

The organic solvent is not particularly limited so long as it is an organic solvent capable of dissolving the dithiocarbamate compound in which $A_1$ represents Formula (2) and the dithiocarbamate compound in which $A_1$ represents Formula (3) which are used as the dithiocarbamate compound represented by Formula (12), and examples thereof include: aromatic hydrocarbons, such as benzene, toluene, xylene and ethyl benzene; ether compounds, such as tetrahydrofuran and diethyl ether; ketone compounds, such as acetone, methyl ethyl ketone, methyl isobutyl ketone and cyclohexanone; and aliphatic hydrocarbons, such as n-heptane, n-hexane and cyclohexane. These organic solvents may be used individually or in combination of two or more types thereof.

The living radical polymerization in the co-presence of the dithiocarbamate compound represented by Formula (12) in which $A_1$ represents Formula (2) and the dithiocarbamate compound represented by Formula (12) in which $A_1$ represents Formula (3) can be performed in an organic solvent solution by heating or irradiating light, such as an ultraviolet ray, however, the polymerization is preferably performed by irradiating light, such as an ultraviolet ray. The light irradiation can be performed by irradiating from the inside or outside of the reaction system using an ultraviolet ray irradiating lamp, such as a low-pressure mercury lamp, a high-pressure mercury lamp, an ultra high-pressure mercury lamp and a xenone lamp. In the living radical polymerization, it is necessary that before the initiation of the polymerization, oxygen in the reaction system is fully purged and the inside of the system is preferably replaced with an inert gas, such as nitrogen and argon. The polymerization time is 0.1 to 100 hours, preferably 1 to 50 hours, more preferably 3 to 30 hours. Generally, according to the time course of the polymerization, the conversion ratio of the monomer (the dithiocarbamate compound represented by Formula (12) in which $A_1$ represents Formula (2) and the dithiocarbamate compound represented by Formula (12) in which $A_1$ represents Formula (3)) is increased. The polymerization temperature is not particularly limited. However, it is 0 to 200° C., preferably 10 to 150° C., more preferably 20 to 100° C.

During the living radical polymerization in the co-presence of the dithiocarbamate compound represented by Formula (12) in which $A_1$ represents Formula (2) and the dithiocarbamate compound represented by Formula (12) in which $A_1$ represents Formula (3), for controlling the molecular weight and the molecular weight distribution, a chain transfer agent, such as mercaptans and sulfides or sulfide compounds, such as tetraethylthiuram disulfide can be used. Further, if desired, anti-oxidants, such as hindered phenols, ultraviolet ray absorbing agents, such as benzotriazoles, polymerization inhibitors, such as 4-tert-butylcatecol, hydroquinone, nitrophenol, nitroscresol, picric acid, phenothiazine and dithiobenzoyl disulfide can be used.

Further, during the living radical polymerization, for controlling the degree of branching and the degree of the polymerization, heretofore known vinyl monomers having no dithiocarbamate group or compounds having unsaturated double bonds can be added. These compounds can be used in a ratio of less than 50 mol % relative to the total amount of the dithiocarbamate compound in which $A_1$ represents Formula (2) and the dithiocarbamate compound in which $A_1$ represents Formula (3) which are used as the dithiocarbamate compound represented by Formula (12). Specific examples of these compounds include styrenes, vinylbiphenyls, vinylnaphthalenes, vinylanthracenes, acrylic esters, methacrylic esters, acrylamides, methacrylamides, vinylpyrrolidones, acrylonitriles, maleic acids, maleimides, divinyl compounds and trivinyl compounds.

Next, the hyperbranched polymer having a hydrogen atom at a molecule terminal thereof is described in detail.

By reducing the hyperbranched polymer having a dithiocarbamate group at a molecule terminal thereof obtained as described above, that is, by converting a dithiocarbamate group at a molecule terminal of the hyperbranched polymer to a hydrogen atom, the hyperbranched polymer represented by Formula (22):

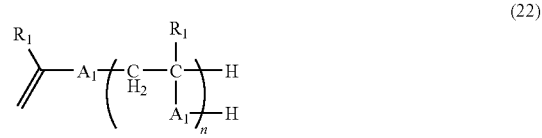

(22)

(where $R_1$ and $A_1$ represent the same as defined in Formula (1)), having the branched repeating unit structure represented by Formula (5) in which the branched repeating unit represented by Formula (4) in which $A_1$ represents Formula (2) and the branched repeating unit represented by Formula (4) in which $A_1$ represents Formula (3) are coupled to each other, and having a hydrogen atom at a molecule terminal thereof can be obtained.

The reduction method is not particularly limited so long as the method is capable of converting a dithiocarbamate group to a hydrogen atom.

The reduction reaction can be effected by using heretofore known reductants, such as hydrogen, hydrogen iodide, hydrogen sulfide, hydrogen aluminum lithium, hydrogen boron sodium, hydrogenated tributyltin, tris(trimethylsilyl) silane, thioglycolic acid and the like. The amount used of the reductant may be 1 to 20 times molar equivalent, preferably 1.5 to 10 times molar equivalent, more preferably 1.8 to times molar equivalent relative to the number of dithiocarbamate groups in the hyperbranched polymer. The conditions for the reduction reaction are appropriately selected from reaction times of 0.01 to 100 hours and reaction temperatures of 0 to 200° C. Preferably, the reaction time is 0.1 to 10 hours and the reaction temperature is 20 to 100° C.

The reduction is preferably performed in water or an organic solvent. The solvent to be used is preferably a solvent capable of dissolving the hyperbranched polymer having a dithiocarbamate group and the reductant. In addition, when the solvent is the same solvent as that used during the production of the hyperbranched polymer having a dithiocarbamate group, the reaction operation becomes simple, which is preferred.

As the reduction method, preferred is a reduction reaction effected by irradiating light in an organic solvent solution using as a reductant, a compound used in the reduction under a radical reaction condition, such as hydrogenated tributyltin.

Examples of the organic solvent capable of being used include: aromatic hydrocarbons, such as benzene, toluene, xylene and ethylbenzene; ether compounds, such as tetrahydrofuran and diethyl ether; ketone compounds, such as acetone, methyl ethyl ketone, methyl isobutyl ketone and cyclohexanone; and aliphatic hydrocarbons, such as n-heptane, n-hexane and cyclohexane. These solvents may be used individually or in combination of two or more types thereof.

The light irradiation can be performed by irradiating from the inside or outside of the reaction system using an ultraviolet ray irradiating lamp, such as a low-pressure mercury lamp, a high-pressure mercury lamp, an ultra high-pressure mercury lamp and a xenone lamp. In this reduction reaction, a reductant, such as hydrogenated tributyltin can be used in an amount of 1 to 10 times molar equivalent, preferably 1.5 to 5 times molar equivalent, more preferably 1.8 to 4 times molar equivalent, relative to the number of dithiocarbamate groups in the hyperbranched polymer.

In addition, the organic solvent is preferably used in an amount of 0.2 to 1,000 times mass, preferably 1 to 500 times mass, more preferably 5 to 100 times mass, most preferably 10 to 50 times mass relative to the mass of the hyperbranched polymer having a dithiocarbamate group at a molecule terminal thereof.

Further, in this reduction reaction, it is necessary that before the initiation of the reaction, oxygen in the reaction system is fully purged and the inside of the system is preferably replaced with an inert gas, such as nitrogen and argon. The reaction conditions are appropriately selected from reaction times of 0.01 to 100 hours and from reaction temperatures of 0 to 200° C. Preferably the reaction time is 0.1 to 2 hours and the reaction temperature is 20 to 60° C.

The hyperbranched polymer of the present invention obtained by the above-described reduction can be separated from the solvent out of the reaction solution by distilling-off the solvent or by solid-liquid separation. Also, by adding the reaction solution to a poor solvent, the hyperbranched polymer of the present invention can be precipitated to be recovered as a powder.

In addition, in the hyperbranched polymer of the present invention containing a hydrogen atom at a molecule terminal thereof, a part of the molecule terminal may be remained as a dithiocarbamate group.

EXAMPLES

Hereinafter, the present invention is described in more detail referring to examples which should not be construed as limiting the scope of the present invention.

In the following Examples, the measurement of physical properties of a sample was performed by using the following apparatuses under the following measuring conditions.
(1) Liquid Chromatography
  Apparatus: manufactured by Agilent; 1100 Series
  Column: Inertsil ODS-2
  Column temp.: 40° C.
  Solvent: Acetonitrile/water=60/40 (volume ratio)
  Detector: RI
(2) Melting Point Measurement
  Apparatus: manufactured by Rigaku Corporation; DSC8230
  Heating rate: 2° C./min
  Nitrogen supply: 60 mL/min
(3) Molecular Weight Measurement (in a Converted Molecular Weight as Polystyrene): Gel Permeation Chromatography
  Apparatus: manufactured by Showa Denko K.K.; Shodex GPC-101
  Column: Shodex GPC KF-805L+GPC KF-804L
  Column temp.: 40° C.
  Solvent: Tetrahydrofuran
  Detector: RI
(4) Elemental Analysis (Carbon, Hydrogen, Nitrogen)
  Apparatus: manufactured by PerkinElmer Co., Ltd.; PE2400II
  Combustion tube temp.: 975° C.
(5) Elemental Analysis (Sulfur)
  Pre-treating apparatus: manufactured by Mitsubishi Chemical Analytech Co., Ltd. Automatic quick furnace AQF-100 type
  Combustion tube temp.: 1000° C.
  Analyzing apparatus: manufactured by NIPPON DIONEX K. IC; ICS-1500
  Column: Dionex AS12A
  Eluant: $Na_2CO_3$ 2.7 mM-$NaHCO_3$ 0.3 mM
(6) Thermogravimetric Analysis
  Apparatus: manufactured by Seiko Instruments Inc.; TG/DTA320
  Heating rate: 10° C./min
  Air supply: 300 mL/min
(7) FT-IR
  Apparatus: manufactured by Nicolet Japan Corporation; NEXUS670
(8) $^1$H-NMR Spectrum
  Apparatus: manufactured by JEOL DATUM LTD.; JNM-LA400
  Solvent: $CDCl_3$
  Internal standard: Tetramethylsilane
(9) Refractive Index Measurement The refractive index of the hyperbranched polymer was calculated by assigning the density value obtained by a dry densimeter and the refractive index value obtained in the state of an N-methylpyrrolidinone solution by a refractometer to the following numerical formula (1).

Densimeter
  Apparatus: Shimadzu Corporation; Accupyc 1330
  Measuring temperature: 25° C.
Refractometer
  Apparatus: manufactured by Kyoto Electronics Manufacturing Co., Ltd.; RA-520N
  Measuring method: method for detecting a light refraction critical angle of Na-D ray
  Measuring temperature: 25° C.
Numerical Formula (1):

[Numerical Formula 1]

$$(n^2-1)/(n^2+2)=\rho(x_H/\rho_H)\times(n_H^2-1)/(n_H^2+2)+\rho(x_s/\rho_s)\times(n_s^2-1)/(n_s^2+2) \quad (1)$$

(where each symbol in the numerical formula (1) is as follows:
n=refractive index of a solution; $n_H$=refractive index of the hyperbranched polymer; $n_s$=refractive index of a solvent; $\rho$=density of a solution; $\rho_H$=density of the hyperbranched polymer; $\rho_s$=density of a solvent; $x_H$=mass ratio of the hyperbranched polymer in a solution; and $x_s$=mass ratio of a solvent in a solution)

Reference Example 1

Synthesis of
N,N-Diethyldithiocarbamylmethylstyrene

In a 2 L reaction flask, 120 g of chloromethylstyrene (manufactured by AGC Seimi Chemical Co., Ltd.; trade name: CMS-14), 181 g of Sodium N,N-diethyldithiocarbamidate trihydrate (manufactured by Kanto Chemical Co., Inc.) and 1,400 g of acetone were charged and while stirring the resultant mixture, the mixture was reacted at a temperature of 40° C. for 1 hour. After the completion of the reaction, deposited sodium chloride was filtered to be removed, and then acetone was distilled off from the reaction solution by an evaporator to obtain a reaction crude powder. The obtained reaction crude powder was redissolved in toluene and the resultant liquid was separated into toluene/water. Thereafter, in a freezer having a temperature of −20° C., an objective was recrystallized from the toluene phase. The recrystallized substance was filtered and dried in vacuum to obtain 206 g (yield; 97%) of an objective in the form of a white powder. The purity (area percentage) was 100% as measured by a liquid chromatography. In addition, the melting point was 56° C. as measured by a DSC measurement.

Reference Example 2

Synthesis of Styrene-Based Hyperbranched Polymer Having Dithiocarbamate Group at Molecule Terminal Thereof In a 300 mL reaction flask, 108 g of N,N-diethyldithiocarbamylmethylstyrene and 72 g of toluene were charged and the resultant mixture was stirred to prepare a light yellow transparent solution, followed by replacing the inside of the reaction system with nitrogen. From the center of the solution, a high pressure mercury lamp of 100 W (manufactured by Sen Lights Co., Ltd.; HL-100) was lighted to perform a photopolymerization reaction by an internal irradiation, while stirring the reaction solution, at a temperature of 30±5° C. for 12 hours. Next, the reaction solution was added to 3,000 g of methanol to reprecipitate a polymer in a massive state having high viscosity and then a supernatant liquid was removed by decantation. Further, the polymer was redissolved in 300 g of tetrahydrofuran and then the resultant solution was added to 3,000 g of methanol to reprecipitate the polymer in a slurry state. The slurry was filtered and dried in vacuum to obtain 48 g of an objective in the form of a white powder. The weight average molecular weight Mw and the degree of distribution Mw/Mn of the polymer were measured by a gel permeation chromatography in a converted molecular weight as polystyrene and found to be 20,900 and 4.9, respectively. The results of the elemental analysis were carbon: 64.6% by mass, hydrogen: 7.4% by mass, nitrogen: 5.0% by mass and sulfur 25.3% by mass. In addition, by a thermal mass analysis, the temperature at which the mass is reduced by 5% was measured and found to be 248° C.

Reference Example 3

Synthesis of N,N-diethyldithiocarbamylethyl methacrylate

In a 2 L reaction flask, 100 g of chloroethyl methacrylate (manufactured by Lancaster Corporation), 178 g of Sodium N,N-diethyldithiocarbamidate trihydrate (manufactured by Kanto Chemical Co., Inc.) and 1,100 g of acetone were charged and while stirring the resultant mixture, the mixture was reacted at a temperature of 40° C. for 14 hours. After the completion of the reaction, deposited sodium chloride was filtered to be removed, and then acetone was distilled off from the reaction solution by an evaporator to obtain a reaction crude powder. The obtained reaction crude powder was redissolved in 1,2-dichloroethane and the resultant liquid was separated into 1,2-dichloroethane/water. Thereafter, 1,2-dichloroethane was distilled off from the 1,2-dichloroethane phase to obtain 171 g (yield; 97%) of an objective in the form of a yellow liquid. The purity (area percentage) was 96% as measured by a liquid chromatography.

Reference Example 4

Synthesis of Acryl-Based Hyperbranched Polymer Having Dithiocarbamate Group at Molecule Terminal Thereof In a 300 mL reaction flask, 90 g of N,N-diethyldithiocarbamylethyl methacrylate and 90 g of toluene were charged and the resultant mixture was stirred to prepare a light yellow transparent solution, followed by replacing the inside of the reaction system with nitrogen. From the center of the solution, a high pressure mercury lamp of 100 W (manufactured by Sen Lights Co., Ltd.; HL-100) was lighted to effect a photopolymerization reaction by an internal irradiation, while stirring the reaction solution, at room temperature for 5 hours. Next, the reaction solution was added to 3.000 g of methanol to reprecipitate a polymer in a massive state having high viscosity and then a supernatant liquid was removed by decantation. Further, the polymer was redissolved in 400 g of tetrahydrofuran and then the resultant solution was added to 5,000 g of methanol to reprecipitate the polymer in a slurry state. The slurry was filtered and dried in vacuum to obtain 44 g of an objective in the form of a white powder. The weight average molecular weight Mw and the degree of distribution Mw/Mn of the polymer were measured by a gel permeation chromatography in a converted molecular weight as polystyrene and found to be 43,200 and 2.9, respectively. The results of the elemental analysis were carbon: 50.8% by mass, hydrogen: 7.6% by mass, nitrogen: 5.1% by mass and sulfur: 25.6% by mass. In addition, by a thermal mass analysis, the temperature at which the mass is reduced by 5% was measured and found to be 186° C.

Example 1

Synthesis of Styrene/Acryl-Based Hyperbranched Copolymer Having Dithiocarbamate Group at Molecule Terminal Thereof In a 50 mL reaction vessel, 2.5 g (9.4 mmol) of N,N-diethyldithiocarbamylmethylstyrene, 7.5 g (28.6 mmol) of N,N-diethyldithiocarbamylethyl methacrylate and 10 g of tetrahydrofuran were charged and the resultant mixture was stirred to prepare a light yellow transparent solution, followed by replacing the inside of the reaction system with nitrogen. From a position distant from the reaction vessel by 7 cm, a high pressure mercury lamp of 100 W (manufactured by Sen Lights Co., Ltd.; HL-100) was lighted to perform a photopolymerization reaction by an external irradiation, while stirring the reaction solution, at room temperature (30±5° C.) for 7 hours. Next, the reaction solution was added to 400 g of methanol to reprecipitate a polymer in a massive state having high viscosity and then, a supernatant liquid was removed by decantation. Further, the polymer was redissolved in 20 g of tetrahydrofuran and then, the resultant solution was added to 400 g of methanol to reprecipitate the polymer in a slurry state. The slurry was filtered and dried in vacuum to obtain 3.9 g of the objective in the form of a white powder. The weight average molecular weight Mw and the degree of distribution Mw/Mn of the polymer were measured by a gel permeation chromatography in a converted molecular weight as polystyrene and found to be 85,800 and 7.8, respectively. The results of the elemental analysis were carbon: 55.2% by mass, hydrogen: 6.9% by mass, nitrogen: 52% by mass and sulfur: 23.5% by mass. In addition, by a thermal mass analysis, the temperature at which the mass is reduced by 5% was measured and found to be 194° C. The content ratios of a methylstyrene unit and an ethyl methacrylate unit in the obtained copolymer were measured by the result of determining the decreased amount of each monomer by a liquid chromatography and found to be methylstyrene unit/ethyl methacrylate unit=26/74 (molar ratio). In addition, the result of the IR measurement of the polymer is shown in FIG. 1.

Example 2 and Example 3

In a charging ratio (molar ratio) shown in Table 1, N,N-diethyldithiocarbamylmethylstyrene and N,N-diethyldithiocarbamylethyl methacrylate were charged and hyperbranched copolymers were prepared in a similar manner to Example 1. The weight average molecular weight, the distribution value and the composition ratio of the obtained copolymer are shown in Table 2 together with those in Example 1. In addition, the refractive index value of the hyperbranched polymers produced in Example 1 to Example 3 and the refractive index value of the hyperbranched polymers produced in Reference Example 2 and Reference Example 4 are also shown together in Table 3. Further, the result of the IR measurement of these polymers are also shown in FIGS. 2 and 3.

TABLE 1

| Example | N,N-diethyldithiocarbamyl-methylstyrene | N,N-diethyldithiocarbamylethyl methacrylate |
|---|---|---|
| 2 | 18.8 mmol | 19.1 mmol |
| 3 | 28.2 mmol | 9.6 mmol |

TABLE 2

| Example | Weight average molecular weight | Distribution value | Composition ratio (molar ratio) (methylstyrene unit/ethyl methacrylate unit) |
|---|---|---|---|
| 1 | 85,800 | 7.8 | 26/74 |
| 2 | 23,100 | 3.8 | 54/46 |
| 3 | 13,800 | 3.0 | 62/38 |

TABLE 3

| | Refractive index value (Na-D ray) |
|---|---|
| Example 1 | 1.61 |
| Example 2 | 1.63 |
| Example 3 | 1.65 |
| Reference Example 2 | 1.60 |
| Reference Example 4 | 1.69 |

Example 4

Reduction of Molecule Terminal of Styrene/Acryl-based Hyperbranched Copolymer Having Dithiocarbamate Group at Molecule Terminal Thereof to Hydrogen Atom In a 50 mL reaction vessel, 2 g of the hyperbranched polymer having a dithiocarbamate group at a molecule terminal thereof obtained in Example 1, 4 g of hydrogenated tributyltin (manufactured by Sigma-Aldrich Co.) and 18 g of tetrahydrofuran were charged and the resultant mixture was stirred to prepare a colorless transparent solution, followed by replacing the inside of the reaction system with nitrogen. From a position distant from the reaction vessel by 7 cm, a high pressure mercury lamp of 100 W (manufactured by Sen Lights Co., Ltd.; HL-100) was lighted to perform a reaction by an external irradiation, while stirring the reaction solution, at room temperature for 1 hour. Next, the reaction solvent was distilled off by reducing the pressure and the resultant residue was diluted with 5 g of chloroform. The diluent was charged into a preparative gel permeation chromatography (apparatus: manufactured by Japan Analytical Industry Co., Ltd. LC-908, column: JAIGEL-1H, 2H (20 mm×60 mm), solvent: chloroform, temperature: 25° C., detector: RI) and a hyperbranched polymer component was fractionated. The solvent in the obtained solution was distilled off by reducing the pressure and the resultant residue was dried in vacuum to obtain 0.2 g of a white powder of a hyperbranched polymer in which a dithiocarbamate group was converted into a hydrogen atom. The weight average molecular weight Mw and the degree of distribution Mw/Mn of the polymer were measured by a gel permeation chromatography in a converted molecular weight as polystyrene and found to be 92,900 and 5.5, respectively. The results of the elemental analysis were carbon: 70.6% by mass, hydrogen: 8.2% by mass, nitrogen: less than 0.5% by mass and sulfur: less than 0.5% by mass. In addition, by a thermal mass analysis, the temperature at which the mass is reduced by 5% was measured and found to be 304° C. The result of a $^1$H-NMR spectrum measurement in which the existence of a peak ascribed to methylstyrene at 2.2 ppm and a peak ascribed to ethyl methacrylate at 4.0 ppm are shown, is shown in FIG. 4.

In addition, the temperatures at which the mass is reduced by 5% of the hyperbranched polymers produced in Examples 1 to 4 and the hyperbranched polymers produced in Reference Examples 2 and 4, are also shown in Table 4.

TABLE 4

| | Temperature at which mass is reduced by 5% measured by thermal mass analysis |
|---|---|
| Example 1 | 194° C. |
| Example 2 | 198° C. |
| Example 3 | 209° C. |
| Example 4 | 304° C. |
| Reference Example 2 | 248° C. |
| Reference Example 4 | 186° C. |

As is apparent from the comparison of the refractive index values in Examples 1 to 3 with those in Reference Examples 2 and 4 which are shown in Table 3, the hyperbranched polymers of copolymers produced in Examples 1 to 3 have refractive index values which are within the range of those of the hyperbranched polymers of homopolymers produced in Reference Examples 2 and 4, therefore, these hyperbranched copolymers can precisely control the refractive index while retaining the structure of the hyperbranched polymer.

In addition, as is also apparent from the comparison of the temperatures at which the mass is reduced by 5% measured by a thermal mass analysis in Example 1 and Example 4 which are shown in Table 4, the hyperbranched polymer in which the molecule terminal thereof is reduced from a dithiocarbamate group to a hydrogen atom has a high temperature at which the mass is reduced by 5% and is thermally stable.

INDUSTRIAL APPLICABILITY

Since the hyperbranched polymer of the present invention can control the desired refractive index and is thermally stable, it can be utilized as optical materials, painting materials, adhesive materials, resin filler, various forming materials, nanometer pore forming agent, resist materials, electronic materials, printing materials, battery materials, medical materials and the like.

BRIEF DESCRIPTION OF THE DRAWINGS

FIG. 1 is an IR spectrum of the hyperbranched polymer obtained in Example 1.

FIG. 2 is an IR spectrum of the hyperbranched polymer obtained in Example 2.

FIG. 3 is an IR spectrum of the hyperbranched polymer obtained in Example 3.

FIG. 4 is an $^1$H-NMR spectrum of the hyperbranched polymer obtained in Example 4.

The invention claimed is:

1. A hyperbranched polymer represented by Formula (5):

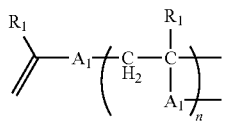
(5)

where
- $R_1$ independently represents a hydrogen atom or a methyl group,
- $A_1$ independently represents Formula (2) or Formula (3):

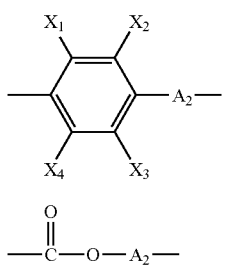

where
- $A_2$ represents a linear, branched or cyclic alkylene group having 1 to 30 carbon atoms, which may contain an ether bond or an ester bond, and
- each of $X_1$, $X_2$, $X_3$ and $X_4$ represents a hydrogen atom, an alkyl group having 1 to 20 carbon atoms, an alkoxy group having 1 to 20 carbon atoms, a halogen atom, a nitro group, a hydroxy group, an amino group, a carboxyl group or a cyano group, and
- n is the number of branched repeating unit structures which represents an integer of 2 to 100,000; and a branched repeating unit structure in Formula (5) has a structure of a branched repeating unit represented by Formula (4)

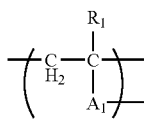
(4)

in which $A_1$ represents Formula (2) and a branched repeating unit represented by Formula (4) in which $A_1$ represents Formula (3) are coupled to each other, with the proviso that $R_1$ in Formula (4) in which $A_1$ represents Formula (2) and $R_1$ in Formula (4) in which $A_1$ represents Formula (3) may be the same as or different from each other, wherein the hyperbranched polymer has a weight average molecular weight of 500 to 5,000,000, as measured by a gel permeation chromatography in a converted molecular weight as polystyrene.

2. The hyperbranched polymer according to claim 1, wherein in the polymerization initiation site represented by Formula (1), $A_1$ represents Formula (6) or Formula (7):

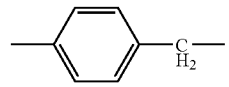
(6)

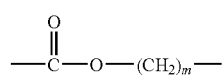
(7)

where m represents an integer of 2 to 10, and a branched repeating unit structure in Formula (5) has a structure in which a branched repeating unit represented by Formula (4) in which $A_1$ represents Formula (6) and a branched repeating unit represented by Formula (4) in which $A_1$ represents Formula (7) are coupled to each other.

3. The hyperbranched polymer according to claim 1, wherein among the total amount of the branched repeating unit represented by Formula (4) contained in the hyperbranched polymer represented by Formula (5), the total amount of the branched repeating unit represented by Formula (4) in which $A_1$ represents Formula (2) is 1 to 99 mol % and the total amount of the branched repeating unit represented by Formula (4) in which $A_1$ represents Formula (3) is 99 to 1 mol %.

4. The hyperbranched polymer according to claim 1, wherein the polymerization initiation site represented by Formula (1) is represented by Formula (8) or Formula (9):

(8)

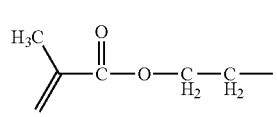
(9)

and the branched repeating unit represented by Formula (4) is represented by Formula (10) or Formula (11):

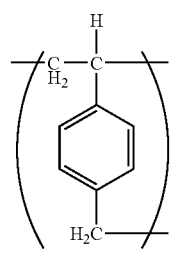
(10)

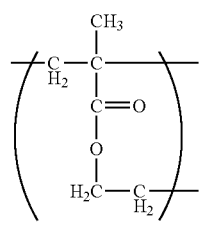
(11)

and the branched repeating unit structure in Formula (5) has a structure in which a branched repeating unit represented by Formula (10) and a branched repeating unit represented by Formula (11) are coupled to each other.

5. The hyperbranched polymer according to claim 1, wherein a molecule terminal thereof is a dithiocarbamate group or a hydrogen atom.

6. A production method of the hyperbranched polymer according to claim 1 comprising:
living-radical polymerizing a dithiocarbamate compound represented by Formula (12):

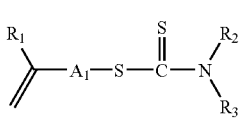

(12)

where
  $R_1$ represents a hydrogen atom or a methyl group,
  $A_1$ represents Formula (2):

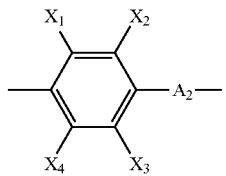

(2)

where
  $A_2$ represents a linear, branched or cyclic alkylene group having 1 to 30 carbon atoms, which may contain an ether bond or an ester bond, and
  each of $X_1$, $X_2$, $X_3$ and $X_4$ represents a hydrogen atom, an alkyl group having 1 to 20 carbon atoms, an alkoxy group having 1 to 20 carbon atoms, a halogen atom, a nitro group, a hydroxy group, an amino group, a carboxyl group or a cyano group, and
  each of $R_2$ and $R_3$ represents an alkyl group having 1 to 5 carbon atoms, a hydroxyalkyl group having 1 to 5 carbon atoms or an arylalkyl group having 7 to 12 carbon atoms, or $R_2$ and $R_3$ may be bonded to each other to form a ring together with a nitrogen atom bonded to $R_2$ and $R_3$,
with a dithiocarbamate compound represented by Formula (12):

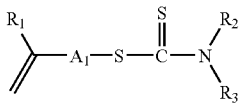

(12)

where
  $R_1$ represents a hydrogen atom or a methyl group,
  $A_1$ represents Formula (3):

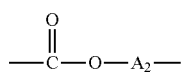

(3)

where
  $A_2$ represents a linear, branched or cyclic alkylene group having 1 to 30 carbon atoms, which may contain an ether bond or an ester bond, and 7. A production method of the hyperbranched polymer according to claim 1, wherein a molecule terminal thereof, which is obtained by living-radical polymerizing the dithiocarbamate compound represented by Formula (12):

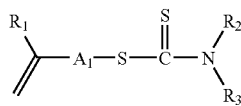

(12)

where
  $R_1$ represents a hydrogen atom or a methyl group,
  $A_1$ represents Formula (2),

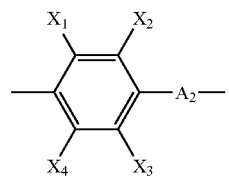

(2)

where
  $A_2$ represents a linear, branched or cyclic alkylene group having 1 to 30 carbon atoms, which may contain an ether bond or an ester bond, and
  each of $X_1$, $X_2$, $X_3$ and $X_4$ represents a hydrogen atom, an alkyl group having 1 to 20 carbon atoms, an alkoxy group having 1 to 20 carbon atoms, a halogen atom, a nitro group, a hydroxy group, an amino group, a carboxyl group or a cyano group, and
  each of $R_2$ and $R_3$ represents an alkyl group having 1 to 5 carbon atoms, a hydroxyalkyl group having 1 to 5 carbon atoms or an arylalkyl group having 7 to 12 carbon atoms, or $R_2$ and $R_3$ may be bonded to each other to form a ring together with a nitrogen atom bonded to $R_2$ and $R_3$,
with the dithiocarbamate compound represented by Formula (12):

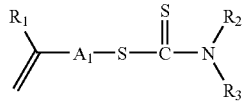

(12)

where
  $R_1$ represents a hydrogen atom or a methyl group,
  $A_1$ represents Formula (3):

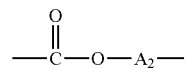

(3)

where
  $A_2$ represents a linear, branched or cyclic alkylene group having 1 to 30 carbon atoms, which may contain an ether bond or an ester bond, and each of $R_2$ and $R_3$ represents an alkyl group having 1 to 5 carbon atoms, a hydroxyalkyl group having 1 to 5 carbon atoms or an arylalkyl group having 7 to 12 carbon atoms, or $R_2$ and $R_3$ may be bonded to each other to form a ring together with a nitrogen atom bonded to $R_2$ and $R_3$;

is a dithiocarbamate group.

8. The production method of the hyperbranched polymer according to claim 6, wherein the dithiocarbamate compound represented by Formula (12) in which $A_1$ represents Formula (2) is N,N-diethyldithiocarbamylmethylstyrene and the dithiocarbamate compound represented by Formula (12) in which $A_1$ represents Formula (3) is N,N-diethyldithiocarbamylethyl methacrylate.

9. The production method of the hyperbranched polymer according to claim 6, wherein the living radical polymerization is performed in an organic solvent solution containing the dithiocarbamate compound represented by Formula (12) by irradiating light.

10. A production method of the hyperbranched polymer according to claim 1 having a hydrogen atom at a molecule terminal thereof comprising:

living-radical polymerizing the dithiocarbamate compound represented by Formula (12):

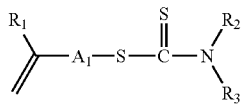

(12)

where
$R_1$ represents a hydrogen atom or a methyl group,
$A_1$ represents Formula (2):

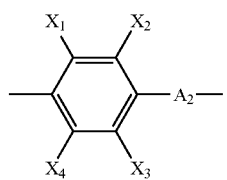

(2)

where
$A_2$ represents a linear, branched or cyclic alkylene group having 1 to 30 carbon atoms, which may contain an ether bond or an ester bond, and
each of $X_1$, $X_2$, $X_3$ and $X_4$ represents a hydrogen atom, an alkyl group having 1 to 20 carbon atoms, an alkoxy group having 1 to 20 carbon atoms, a halogen atom, a nitro group, a hydroxy group, an amino group, a carboxyl group or a cyano group, and each of $R_2$ and $R_3$ represents an alkyl group having 1 to 5 carbon atoms, a hydroxyalkyl group having 1 to 5 carbon atoms or an arylalkyl group having 7 to 12 carbon atoms, or $R_2$ and $R_3$ may be bonded to each other to form a ring together with a nitrogen atom bonded to $R_2$ and $R_3$, with the dithiocarbamate compound represented by Formula (12):

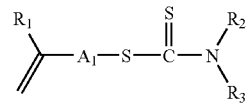

(12)

where
$R_1$ represents a hydrogen atom or a methyl group,
$A_1$ represents Formula (3):

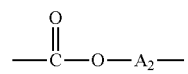

(3)

where
$A_2$ represents a linear, branched or cyclic alkylene group having 1 to 30 carbon atoms, which may contain an ether bond or an ester bond, and
each of $R_7$ and $R_3$ represents an alkyl group having 1 to 5 carbon atoms, a hydroxyalkyl group having 1 to 5 carbon atoms or an arylalkyl group having 7 to 12 carbon atoms, or $R_2$ and $R_3$ may be bonded to each other to form a ring together with a nitrogen atom bonded to $R_2$ and $R_3$; and reducing a dithiocarbamate group at a molecule terminal of the hyperbranched polymer obtained by the polymerization.

11. The production method of the hyperbranched polymer according to claim 10, wherein the dithiocarbamate compound represented by Formula (12) in which $A_1$ represents Formula (2) is N,N-diethyldithiocarbamylmethylstyrene and the dithiocarbamate compound represented by Formula (12) in which $A_1$ represents Formula (3) is N,N-diethyldithiocarbamylethyl methacrylate.

12. The production method of the hyperbranched polymer according to claim 10, wherein the reduction is performed by irradiating light in the presence of hydrogenated tributyltin.

13. The production method of the hyperbranched polymer according to claim 10, wherein the reduction is performed by irradiating light in an organic solvent solution containing a hyperbranched polymer having a dithiocarbamate group at a molecule terminal thereof in the presence of hydrogenated tributyltin.

* * * * *